United States Patent [19]

Born et al.

[11] Patent Number: 5,699,662

[45] Date of Patent: Dec. 23, 1997

[54] INFRARED SUPPRESSION EXHAUST DUCT SYSTEM FOR A TURBOPROP PROPULSION SYSTEM FOR AN AIRCRAFT

[75] Inventors: Gary A. Born; Thomas A. Roberts, both of Riverside; Peter M. Boor, Ontario, all of Calif.

[73] Assignee: Lockheed Martin Corporation, Palmdale, Calif.

[21] Appl. No.: 654,362

[22] Filed: May 28, 1996

[51] Int. Cl.⁶ .......................................... F02K 1/00
[52] U.S. Cl. ........................ 60/39.5; 60/39.31; 60/271; 244/52
[58] Field of Search ................... 60/39.5, 39.31, 60/226.1, 271, 230, 266; 244/52, 53 R, 54; 239/265.19

[56] References Cited

U.S. PATENT DOCUMENTS

| | | | |
|---|---|---|---|
| D. 350,722 | 9/1994 | Figueroa | D12/345 |
| D. 357,665 | 4/1995 | Creyts | D12/194 |
| 3,180,087 | 4/1965 | Marchant | 244/52 |
| 3,181,293 | 5/1965 | Orchard et al. | 244/52 |
| 3,210,934 | 10/1965 | Smale | 60/265 |
| 3,912,202 | 10/1975 | Jenkins | 244/52 |
| 3,981,448 | 9/1976 | Demogenes et al. | 60/271 |
| 4,002,024 | 1/1977 | Nye et al. | 60/262 |
| 4,007,587 | 2/1977 | Banthin et al. | 60/39.5 |
| 4,018,146 | 4/1977 | Hurley | 239/265.19 |
| 4,215,537 | 8/1980 | Hurley | 60/39.5 |
| 4,295,332 | 10/1981 | Steyer et al. | 60/264 |
| 4,662,174 | 5/1987 | Toulmay | 60/39.5 |
| 4,721,271 | 1/1988 | Goldstein et al. | 244/52 |
| 4,998,995 | 3/1991 | Blythe | 244/53 R |

FOREIGN PATENT DOCUMENTS 2220632  12/1989  United Kingdom ............ 244/54

*Primary Examiner*—Charles G. Freay
*Assistant Examiner*—Ted Kim
*Attorney, Agent, or Firm*—Robert A. Schruhl

[57] ABSTRACT

The invention is an exhaust duct system for an aircraft, the aircraft having at least one turboprop propulsion system mounted on the wing within a nacelle, the propulsion system having a circular shaped exhaust port generally aligned with the longitudinal axis of the aircraft. In detail, the invention includes a generally shallow S shaped duct having a longitudinal axis aligned with the longitudinal axis of the exhaust port. A duct includes a circular shaped inlet section, a rectangular exhaust port section and a transition section therebetween. The inlet has a larger diameter than the exhaust port of the propulsion system and is positioned there about. The inlet includes a plurality of flexible finger like members extending inward such that they are in slidable engagable with the external surface of the exhaust port. A first pair of struts are pivotally connected at the center of the rectangular exhaust port section by their first ends and extend upward and outward from the longitudinal axis of the duct with their second ends pivotally connected to the underside of the wing. A second pair of struts are pivotally connected to the sides of the transition section by their first ends and extend upward and rearwards from the inlet slightly outward and having second ends pivotally coupled to the underside of the wing.

4 Claims, 3 Drawing Sheets

INFRARED SUPPRESSION EXHAUST DUCT SYSTEM FOR A TURBOPROP PROPULSION SYSTEM FOR AN AIRCRAFT

FIELD OF THE INVENTION

The invention relates to the field of infrared suppression exhaust systems for aircraft mounted turboprop propulsion systems and, in particular, to an infrared suppression exhaust duct system for an aircraft having the propulsion system installed in wing mounted nacelles.

DESCRIPTION OF RELATED ART

Infrared suppression exhaust duct systems for aircraft are usually designed into the basic propulsion system. Typically, they use a center body in the exhaust nozzle to prevent direct viewing of the turbine section of the engine. An additional method used is to transform the generally round inlet of the exhaust duct to a two dimensional exhaust nozzle. This has the effect of ejecting the hot exhaust gases out in a horizontal "sheet" reducing the detection angle on or about the horizontal plane of the aircraft. An example of an infrared suppression exhaust duct can be found on the US Air Force F117A fighter bomber. In this aircraft, an internally mounted exhaust duct is coupled directly to the jet engine aft of the turbine. The initially round cross-section expands into a two-dimensional (rectangular shape) exhaust nozzle and in a side view has a very shallow S shape. The unusual aspect of the design is the incorporation of a coanda surface in the rectangular section that shields the turbine section of the engine when looking into the nozzle. Because the exhaust duct is internally mounted within the fuselage of the aircraft, its length can be very long and it can be semi-rigidly mounted therein. However, the use of such a design on a wing mounted turbo prop engine would impractical.

On conventional reciprocating or turboprop powered propulsion systems for aircraft, the exhaust ducts are generally as short as possible to keep weight to a minimum and noise reduction is not taken into consideration. However, with the advent of infrared seeking missiles, it has become necessary to retrofit infrared suppression exhaust ducts on existing military aircraft. More recently, they even being incorporated on commercial aircraft. Needless to say, this minimum weight view is identical when considering infrared suppression. Thus such systems are kept as small as possible.

Typical examples of a infrared signature suppression exhaust ducts are illustrated in Design Patent Nos. 357,722 "Exhaust Duct" by L. Figueroa and 357,665 "Exhaust Duct" by D. Creyts. The exhaust duct in Design Patent No. 357,722 "Exhaust Duct" by L. Figueroa was designed for use on the US Air Force C-130 aircraft manufactured by the Lockheed Martin Corporation. The "S" duct design prevents direct viewing of the hot turbine of the turboprop engine and the transition from a circular cross-section to a rectangular cross-section further reduces the exhaust gas temperature. However, retrofitting such an exhaust duct to the propulsion systems not originally designed to include it, can be a difficult task.

Thus it is a primary object of the subject invention to provide an infrared exhaust duct system for such an aircraft.

It is another primary object of the subject invention to provide an infrared exhaust duct system for an aircraft that requires minimum changes to the aircraft.

It is a further object of the subject invention to provide an infrared exhaust duct system for an aircraft that accommodates the relative movement between the propulsion system and airframe.

It is a still further object of the subject invention to provide an infrared exhaust duct system for an aircraft that further includes infrared signature reduction for the actual exhaust duct.

SUMMARY OF THE INVENTION

The invention is an infrared suppression exhaust duct system for an aircraft, the aircraft having at least one turboprop propulsion system mounted on the wing within a nacelle, the propulsion system having a circular shaped exhaust port generally aligned with the longitudinal axis of the aircraft. In detail, the invention includes a generally shallow S shaped duct having a longitudinal axis aligned with the longitudinal axis of the exhaust port. The duct includes a circular shaped inlet section, a rectangular exhaust port section and a transition section therebetween. The inlet has a larger diameter than the exhaust port of the propulsion system and is positioned thereabouts so that their centerlines are aligned. The inlet includes a plurality of flexible finger like members extending inward from the inner wall thereof such that they are in slidable engagement with the external surface of the exhaust port. Thus the exhaust duct is in flexible engagement with the exhaust port being slidable fore and aft therealong, rotatable in relationship thereto, as well as able to displace its centerline from that of the exhaust port.

Mounted about the exhaust duct is a conformal shroud joined thereto by a plurality of fastener assemblies. Because of the high temperatures of the exhaust gases from the engine, the exhaust duct is made of temperature resistant material such as titanium, nickel or steel alloy. However, the shroud is made of composite material and acts as an insulator to prevent heat from radiating from the exhaust duct. Of course, the interior of the exhaust nozzle and external surfaces of the shroud are coated with low emissivity materials to further reduce the infrared signature of the aircraft.

A first pair of struts are pivotally connected at the center of the rectangular exhaust port section by their first ends and extend upward and outward from the longitudinal axis of the duct with their second ends pivotally connected to the underside of the wing. A second pair of struts are pivotally connected to the sides of the transition section by their first ends and extend upward and rearwards from the inlet and slightly outward and having second ends pivotally coupled to the underside of the wing.

Thus as the propulsion system vibrates or moves under torque loads, etc., the exhaust duct can move there along without inducing significant structural loads into the exhaust port of the engine or into the aircraft structure. Furthermore, even though there is a leakage path about the flexible fingers in the inlet of the exhaust duct, the "path of least resistance" is along the duct and no exhaust reverses flow direction to exit between the inlet and exhaust port. The advantage of the invention is that it can be easily retrofitted to exiting aircraft requiring no structural reinforcements of the aircraft.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
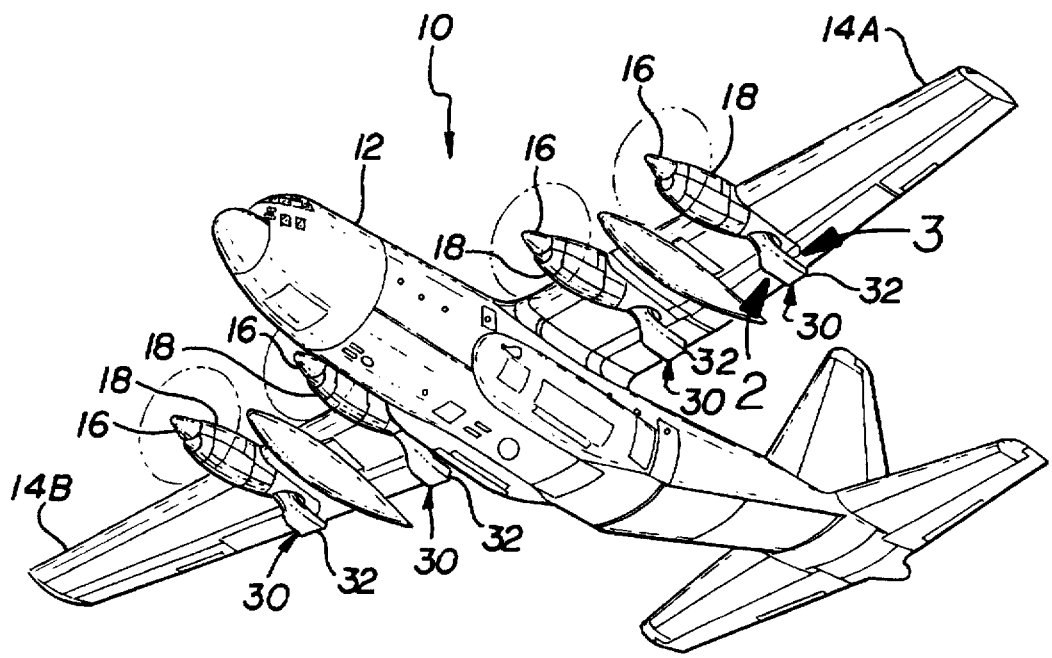
FIG. 1 is a perspective view of a C-130 Hercules aircraft incorporating the subject exhaust duct system.
Figure 2:
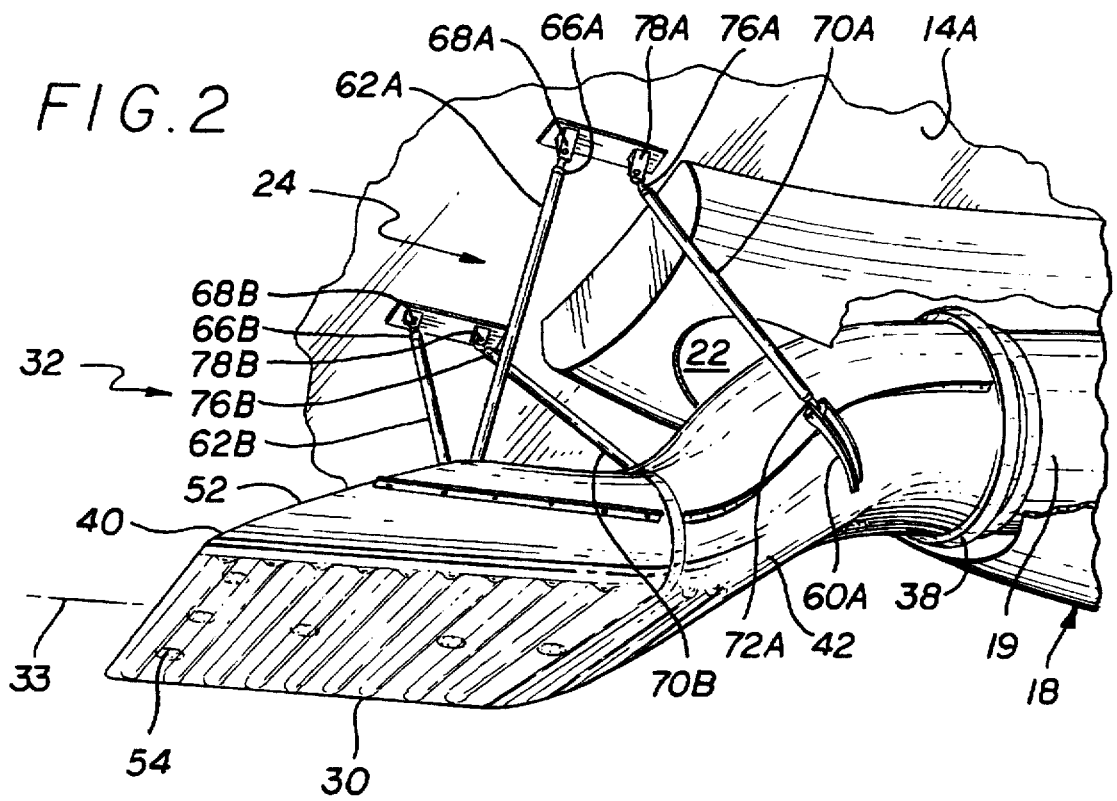
FIG. 2 is a partial perspective view of the aircraft shown in FIG. 1 taken along the arrow 2 illustrating the exhaust duct system coupled to the exhaust port of the engine and mounted to the underside of the wing.
Figure 3:
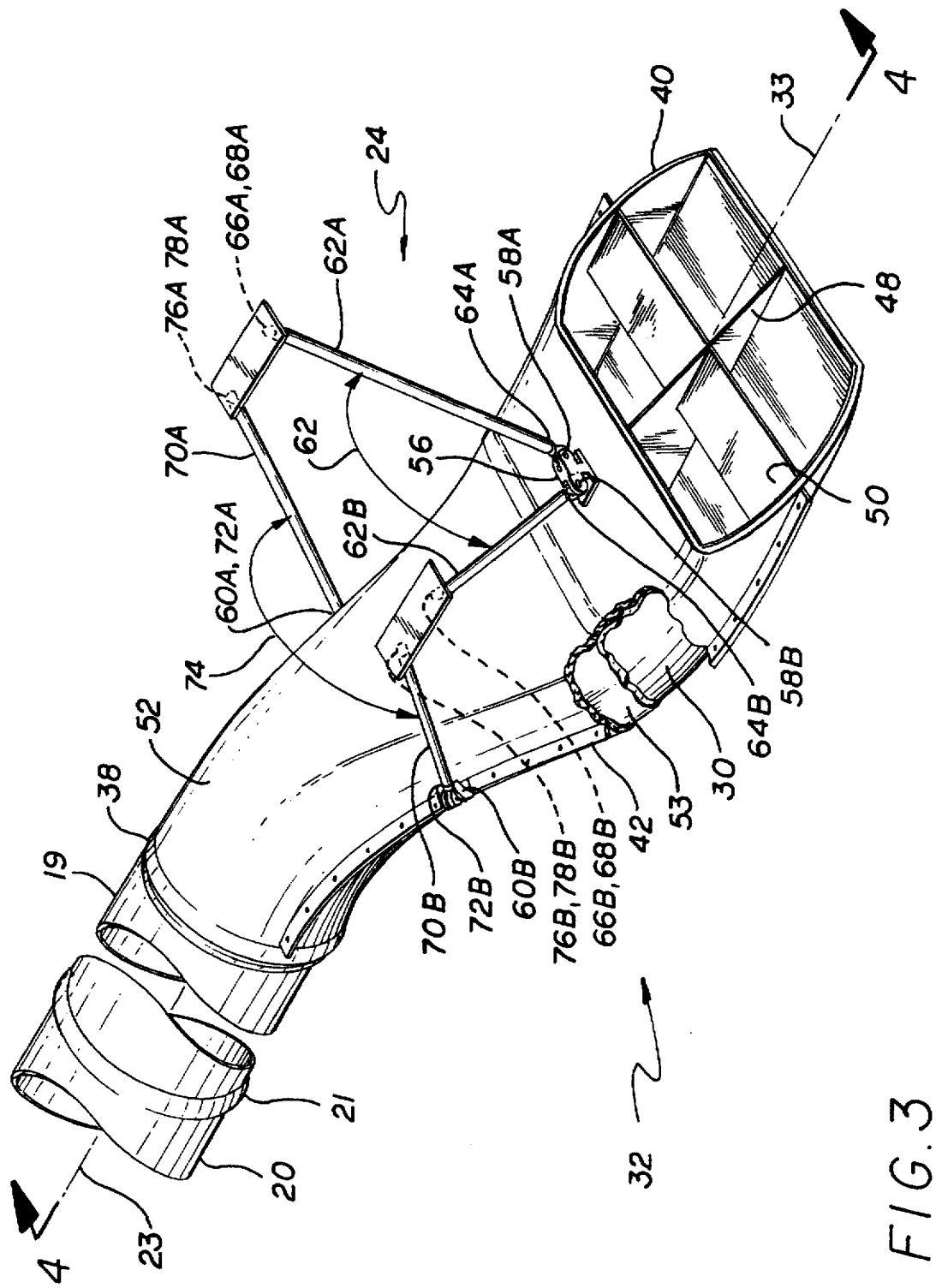
FIG. 3 is a perspective view of the wing aircraft shown in FIG. 1 taken along the arrow 3 illustrating the exhaust duct system coupled to the exhaust port of the engine and mounted to the underside of the wing.
Figure 4:
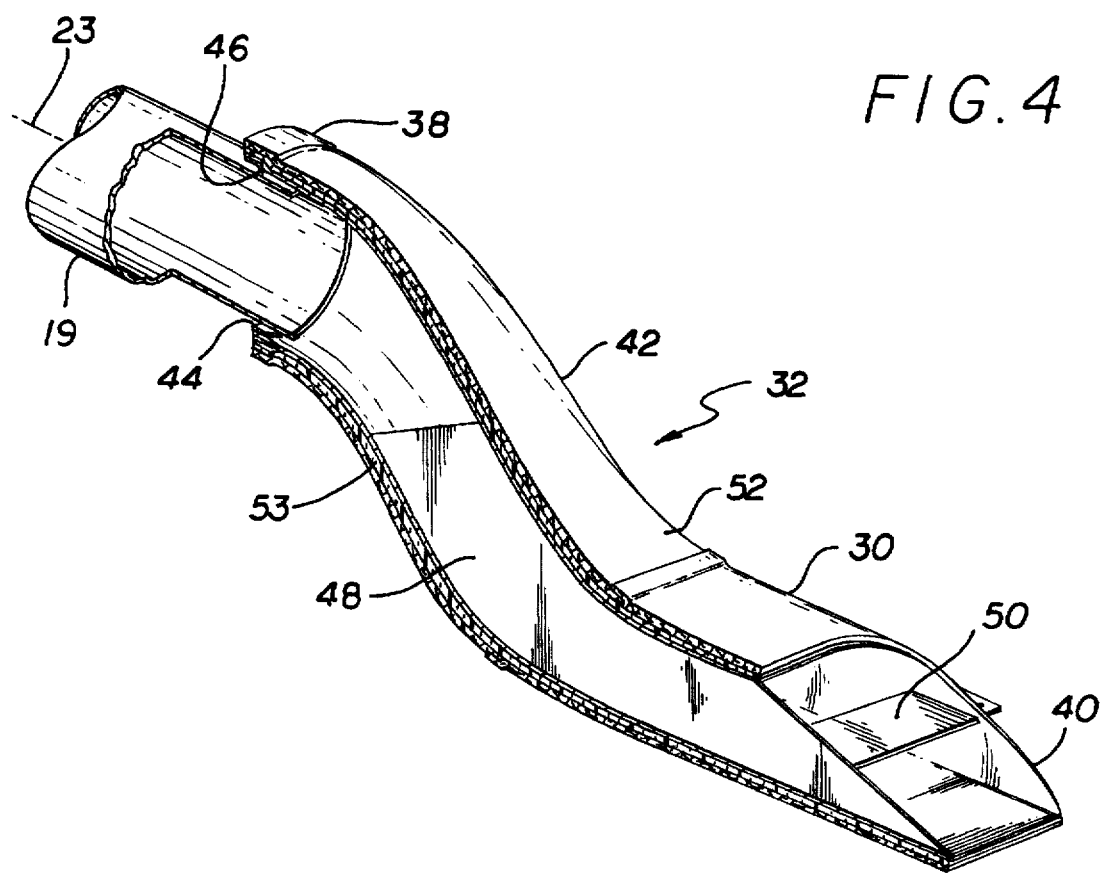
FIG. 4 is a perspective cross-sectional view of the exhaust duct shown in FIG. 3 taken along the line 4—4.

Illustrated in FIG. 1-4 is a C-130 Hercules aircraft manufactured by the Lockheed Martin Corporation, generally indicated by numeral 10, while illustrated in FIGS. 2-4 are partial views of the aircraft. The aircraft 10 has a fuselage 12, wings 14A and 14B with four turboprop engines 16 mounted in nacelles 18. A transition duct 19 is coupled to the exhaust port 20 of the engine 16 by means of a clamp 21 and extends out an existing opening 22 in the nacelle 18. The subject exhaust duct system, indicated by numeral 30, includes a generally S shaped exhaust duct 32 having a longitudinal axis 33 aligned with the longitudinal axis 23 of the transition duct 19 and coupled thereto, supported by a strut assembly 24.

The exhaust duct 32, having a longitudinal axis includes a circular inlet section 38, a rectangular shaped exhaust nozzle section 40 with a transition section 42 therebetween. The inlet section 38 includes an internally mounted annular ring 44 having a plurality of flat finger like members 46 in slidable contact with the transition duct 19. A vertical reinforcement 48 extends from the exhaust nozzle section 40 and into the transition section 42 and a horizontal reinforcement 50 is mounted in the exhaust nozzle section. Mounted about the exhaust duct is a conformal shroud 52 joined thereto by a plurality of fastener assemblies 54. Because of the high temperatures of the exhaust gases from the engine 16, the exhaust duct 32 is made of a temperature resistant material such as titanium or steel alloy. However, the shroud 52 is made of non-metallic composite material and acts as insulator to prevent heat from radiating from the exhaust duct 32 to the ambient environment. Of course, the interior of the exhaust nozzle 32 and external surfaces of the shroud 52 are coated with low emissivity materials to further reduce the infrared signature of the aircraft. Sandwiched between the exhaust duct 32 and shroud 52 is a thermal blanket 53.

A fitting 56 is mounted on the top of the exhaust nozzle section 40 along the longitudinal axis 33 having two clevises 58A and 58B in close proximity to each other, while mounted on each side of the transition section 42, equally spaced from the longitudinal axis 33, are clevises 60A and 60B. A pair of rear struts 62A and 62B are pivotally mounted by their ends 64A and 64B to the clevises 58A and 58B, respectively. Rear struts 62A and 62B extend upward at an acute angle 62 to each other and generally perpendicular to the longitudinal axis 33 and are pivotally connected by their second ends 66A and 66B to lugs 68A and 68B, respectively, mounted to the underside of the wing 14A. Thus the rear struts 62A and 62B resist lateral movement of the exhaust duct 32. A pair of front struts 70A and 70B are mounted by their first ends 72A and 72B to the clevises 60A and 60B, respectively. The front struts 70A and 70B extend upward at an acute angle 74 to each other and generally upward and rearward and are pivotally connected by their second ends 76A and 76B to clevises 78A and 78B, respectively, mounted to the underside of the wing 14A in close proximity to lugs 68A and 68B, respectively. Thus the front struts 70A and 70B resist rearward movement of the exhaust duct 32, but allow lateral movement (along with rotation about its longitudinal axis 33 thereof).

Figure 5:
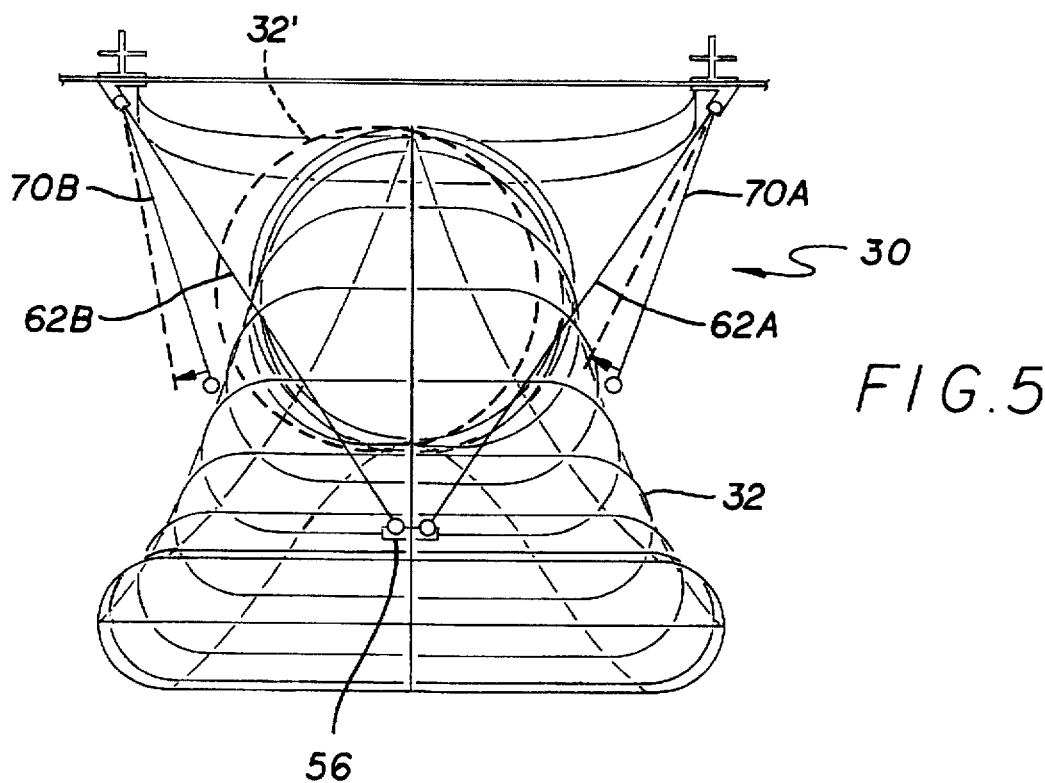
FIG. 5 is a schematic representation of the exhaust duct system looking directly from the rear.

Referring to FIG. 5, it can be seen that the exhaust duct system 30 can compensate for movement of the turboprop engine due to torque loads as power is increased and, of course, normal engine vibrations. As illustrated, the exhaust duct shown in dotted lines and indicated by numeral 32' is shown deflected to the left due to engine torqueing. The front struts 70A and 70B are rotated to the left, however, the rear struts 62A and 62B resist lateral movement and the exhaust duct 32 literally rotates about the fitting 56 to the position indicated by numeral 32'. Thus it can be seen that the exhaust duct system 30 can provide a reduction in the infrared signature of the aircraft 10 by blocking off direct viewing of the hot sections of the engine 16. The use of low emissivity coatings on the interior surfaces of the exhaust duct 30 further reduces the aircraft's signature from the rear. Finally, the shroud 52 and thermal blanket 53 also shield the heated exhaust duct 30 from infrared detection from directly below the aircraft.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY The invention has application to the commercial and military aircraft industry.

We claim:

1. An exhaust duct system for an aircraft, the aircraft having at least one turboprop propulsion system mounted on the wing within a nacelle, the propulsion system having a circular shaped exhaust port generally aligned with the longitudinal axis of the aircraft, system comprising:

a generally shallow S shaped duct having a longitudinal axis aligned with the longitudinal axis of the exhaust port, a circular shaped inlet section, and a rectangular exhaust port section and a transition section therebetween; with the inlet having a larger diameter than the exhaust port of the propulsion system and positioned there about, said inlet portion having means to provide flexible engagement with an external surface of the exhaust port, a first pair of struts having first ends pivotally connected at a central position of the rectangular exhaust port section, said first pair of struts extending upward and outward from the longitudinal axis of the duct and having second ends pivotally connected to the underside of the wing; and a second pair of struts having first ends pivotally connected to the sides of said transition section, said second pair of struts extending upward and rearwards from the inlet and slightly outward and having second ends pivotally coupled to the underside of the wing.

2. The system as set forth in claim 1 wherein means to provide flexible engagement with the external surface of the exhaust port comprises said inlet having a plurality of flexible finger like members extending inward such that said finger like member are in slidable engagement with the external surface of the exhaust port.

3. The system as set forth in claim 2 wherein said first pair of struts are generally perpendicular to said longitudinal axis of said exhaust duct.

4. The system as set forth in claim 3 wherein said exhaust duct is covered with a non-metallic shroud.

* * * * *